United States Patent
Zeller et al.

(10) Patent No.: US 10,568,008 B2
(45) Date of Patent: Feb. 18, 2020

(54) TERMINAL, METHOD OF OPERATING A TERMINAL, TRANSMISSION COORDINATOR DEVICE, BASE STATION AND METHOD OF OPERATING A TRANSMISSION COORDINATOR DEVICE

(71) Applicant: Alcatel Lucent, Boulogne Billancourt (FR)

(72) Inventors: Dietrich Zeller, Stuttgart (DE); Hajo Bakker, Stuttgart (DE); Danish Aziz, Stuttgart (DE); Uwe Doetsch, Stuttgart (DE); Anton Ambrosy, Stuttgart (DE)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/562,279

(22) PCT Filed: Jan. 27, 2016

(86) PCT No.: PCT/EP2016/051651
§ 371 (c)(1),
(2) Date: Sep. 27, 2017

(87) PCT Pub. No.: WO2016/155903
PCT Pub. Date: Oct. 6, 2016

(65) Prior Publication Data
US 2018/0084466 A1    Mar. 22, 2018

(30) Foreign Application Priority Data

Mar. 27, 2015    (EP) .................................. 15290086
Dec. 18, 2015    (EP) .................................. 15307051

(51) Int. Cl.
*H04W 4/00*    (2018.01)
*H04W 36/00*    (2009.01)
*H04W 24/02*    (2009.01)

(52) U.S. Cl.
CPC ....... *H04W 36/0083* (2013.01); *H04W 24/02* (2013.01)

(58) Field of Classification Search
CPC .......................... H04W 36/0083; H04W 24/02
(Continued)

(56) References Cited

U.S. PATENT DOCUMENTS

2003/0040311 A1    2/2003    Choi
2005/0044130 A1*   2/2005    Sillasto ............... H04L 41/5025
                                                          709/200
(Continued)

FOREIGN PATENT DOCUMENTS

CN    1265669 C     7/2006
CN    103491647 A   1/2014
(Continued)

OTHER PUBLICATIONS

"3rd Generation Partnership Project; Technical Specification Group Radio Access Network: Evolved Universal Terrestrial Radio Access (E-UTRA); Radio Resource Control (RRC); Protocol specification (Release 12)," 3GPP TS 36.331, No. V12.4.1, pp. 1-410, XP050927575, (Jan. 2015).

(Continued)

*Primary Examiner* — Sai Ming Chan
(74) *Attorney, Agent, or Firm* — Fay Sharpe LLP

(57) ABSTRACT

The invention relates to a terminal (10) for a cellular communications network (1000). The terminal is configured to maintain a first set (S1) of at least n radio cells, wherein n is equal to or greater than three, wherein a quality measure (q) value of each of the n radio cells, which depends on a received signal power associated with reference signals transmitted in said cells and received by said terminal (10), exceeds a threshold. The terminal further determines whether a quality measure value of a further radio cell, (Continued)

which is not comprised in the first set, exceeds the quality measure value of the radio cell comprised in the first set with the m-th best quality measure value, m ranging from 1 to n−1, by a predetermined amount. If the quality measure value of the further radio cell (c12) exceeds the quality measure value of the m-th best radio cell, modification of the first set is arranged, whereby a second set (S2) is obtained. The second set comprises the further radio cell.

20 Claims, 10 Drawing Sheets

(58) Field of Classification Search
    USPC .......................................................... 370/252
    See application file for complete search history.

(56) References Cited

U.S. PATENT DOCUMENTS

| | | | | |
|---|---|---|---|---|
| 2010/0220680 A1* | 9/2010 | Ramankutty | ......... | H04W 68/08 370/329 |
| 2012/0094629 A1* | 4/2012 | Liu | ....................... | H04W 36/06 455/404.1 |
| 2012/0195255 A1* | 8/2012 | Nylander | .............. | H04W 60/04 370/328 |
| 2012/0294184 A1* | 11/2012 | Jung | ..................... | H04W 24/10 370/252 |
| 2014/0066058 A1* | 3/2014 | Yu | ........................... | H04L 67/16 455/434 |
| 2014/0086173 A1* | 3/2014 | Sadeghi | .................. | H04L 5/005 370/329 |
| 2015/0296551 A1* | 10/2015 | Kim | ...................... | H04W 76/14 455/426.1 |

FOREIGN PATENT DOCUMENTS

| | | |
|---|---|---|
| EP | 2 731 378 A1 | 5/2014 |
| WO | WO 2008/085838 A1 | 7/2008 |

OTHER PUBLICATIONS

International Search Report for PCT/EP2016/051651 dated Apr. 4, 2016.

* cited by examiner

| S1 | |
|---|---|
| c1 | q1 |
| c2 | q2 |
| c3 | q3 |
| ⋮ | ⋮ |
| col 1 | col 2 |

| S2 | |
|---|---|
| c12 | q12 |
| c11 | q11 |
| c8 | q8 |
| ⋮ | ⋮ |
| col 3 | col 4 |

TERMINAL, METHOD OF OPERATING A TERMINAL, TRANSMISSION COORDINATOR DEVICE, BASE STATION AND METHOD OF OPERATING A TRANSMISSION COORDINATOR DEVICE

FIELD OF THE INVENTION

The invention relates to a terminal for a cellular communications network. The invention further relates to a method of operating such terminal. Still further, the present invention relates to a transmission coordinator device, a base station comprising such a transmission coordinator device, and to a method of operating such transmission coordinator device.

BACKGROUND

State of the art cellular communications networks such as e.g. UMTS or LTE networks provide handover mechanisms requiring a certain amount of signalling on the air interface between terminals and serving base stations. In future wireless networks, e.g. fifth generation (5G) networks, small data packet services will be used more frequently. These services, in contrast to broadband services, typically have a low data rate and/or are non-real time and delay-tolerant and/or cause sporadic traffic. As a result, signaling messages over the air interface between radio access nodes (e.g. base stations) and terminals (e.g. user terminals), as well as signaling messages towards a mobility management entity (MME) or the like dominate the available radio resources. For efficient use of radio resources within future wireless networks there is thus a need to reduce the number of signaling messages related to small data packet services.

SUMMARY

It is an objective of the present invention to provide an improved terminal and method of operating a terminal which reduce the signalling load, especially on the air interface.

According to an embodiment of the invention, this objective is achieved by a terminal for a cellular communications network, wherein the terminal is configured to: maintain a first set of at least n radio cells of the communications network, wherein n is equal to or greater than three, wherein a quality measure value of each of the n radio cells, which depends on a received signal power associated with reference signals transmitted in the cells and received by the terminal, exceeds a threshold; determine whether a quality measure value of a further radio cell, which is not comprised in the first set, exceeds the quality measure value of the radio cell comprised in the first set with the m-th best quality measure value, m ranging from 1 to n−1, by a predetermined amount; and if the quality measure value of the further radio cell exceeds the quality measure value of the radio cell comprised in the first set with the m-th best quality value by the predetermined amount, arrange modification of the first set, whereby a second set is obtained, the second set comprising the further radio cell.

The predetermined amount may represent an offset sufficiently large to enable a sufficiently reliable decision. The predetermined amount may equal zero.

Preferably, the parameter m equals 1, i.e. m=1. In this case, the quality measure value of the further radio cell, which is not comprised in the first set, exceeds the quality measure value of the radio cell comprised in the first set with the best quality measure value by a predetermined amount. According to Applicant's consideration, this will typically only take place if a roaming terminal is comparatively close to the further radio cell, wherein it can be expected that it is not likely that the terminal moves back to the area defined by the first set of radio cells.

By maintaining the first set of radio cells and eventually arranging modification of said first set of radio cells to obtain the second set of radio cells, the terminal advantageously provides information indicative of an area—in terms of radio cells—with a comparatively high probability of successfully establishing data communications with the terminal even without knowledge of the terminal's precise geographic location. Rather, according to the principle of the embodiments, the first set of radio cells or a modified set derived therefrom, i.e. the second set of radio cells, comprises a plurality of radio cells that may potentially be used for serving the terminal. Insofar, the area covered by the first set and second set may also be considered as a "UE centric tracking area" within which the terminal may be assumed to be located for a considerable amount of time, as compared to the presence of a conventional terminal within a single radio cell.

The set of radio cells, either the first set or the second set, or any further set potentially derived therefrom, may e.g. be maintained, or kept, in form of a list, preferably an ordered list or a table or the like. In case of an ordered list or ordered table, the ordering may e.g. be performed depending on the quality measure value associated to the respective radio cells. The terminal may be configured to update the quality measure values of the cells in the set regularly, while moving within an area covered by the cells of the set.

In some embodiments, the terminal is further configured to: determine the n radio cells with a quality measure value exceeding the threshold; report the n radio cells to a further device, preferably to a base station of the communications network and/or to a transmission coordinator device; and receive an established set of cells corresponding to the first set from the further device. This enables the further device to establish a set of cells that not only includes the radio cells reported by the terminal, i.e. the n radio cells, but may further include further radio cells added in view of knowledge about the communication network and/or terminal available at the network side. Aforementioned actions may be performed upon initialization and/or upon initial access to the network.

In some embodiments, said arranging modification is performed in a similar fashion. That is, the terminal reports the further radio cell to a further device, preferably to a base station of communications network and/or to a transmission coordinator device, and receives a further established set of cells corresponding to the second set from the further device. Establishing the second set may then be executed in a similar fashion, using similar considerations, as described above with respect to establishing the first set of radio cells.

Preferably, the terminal does not only send the further radio cell, but instead determines a plurality of radio cells with a quality measure value exceeding a further threshold, and subsequently reports the plurality of radio cells to the further device. The plurality of radio cells includes the further radio cell. The terminal then receives the second set of radio cells from the further device, the second set including the plurality of radio cells and optionally one or more further radio cells included by the further device on the basis of knowledge about the communication network and/or terminal at the network side.

Embodiments of the invention are further related to a method of operating a terminal for a cellular communications network, the method comprising: maintaining a first set of at least n radio cells of the communications network, wherein n is equal to or greater than three, wherein a quality measure of each of the n radio cells, which depends on a received signal power associated with reference signals transmitted in the cells and received by the terminal, exceeds a threshold; determining whether a quality measure value of further radio cell, which is not comprised in the first set, exceeds the quality measure value of the radio cell comprised in the first set with the m-th best quality measure value, m ranging from 1 to n−1, wherein m preferably equals 1, by a predetermined amount; and if said quality measure value of said further radio cell exceeds the quality measure value of the radio cell comprised in the first set with the m-th best quality value by the predetermined amount, arranging modification of the first set, whereby a second set is obtained, the second set comprising the further radio cell.

Embodiments of the invention are further related to a transmission coordinator device for a cellular communications network, wherein said transmission coordinator device is configured to: receive from a terminal of the network a message reporting n radio cells of said communications network with a quality measure value exceeding a threshold, wherein n is equal to or greater than three, wherein a quality measure of each of the n radio cells, which depends on a received signal power associated with reference signals transmitted in the cells and received by the terminal; determining a set of radio cells, the set comprising the n radio cells received from the terminal, the set of radio cells covering a location area associated with the terminal; and reporting the set of radio cells as determined to the terminal.

As already outlined above, the functionality of the transmission coordinator device may e.g. be located in a discrete device external to a base station of the cellular communications network. However, the functionality of the transmission coordinator device may also be integrated in one or more base stations of the network. Also, the functionality of the transmission coordinator device may be distributed to the various devices of the cellular communications network.

The transmission coordinator device may be configured to perform one or more of the following steps: transfer a UE context and/or a UE identifier associated with a terminal to one or more further devices, wherein preferably the one or more further devices are associated with a radio cell of the first set and/or the second set, set up a signaling tunnel with a further device, wherein preferably the further device is associated with a radio cell of the first set and/or the second set.

In some embodiments, to enable paging within the area covered by the cells of the first set and/or second set without the need of an external paging trigger from a network component upstream base stations serving cells within the first set and/or second set, the transmission coordinator device may be further configured to forward downlink data to the terminal after paging the terminal within a location area associated with the terminal, wherein the paging comprises: upon receipt of a paging trigger, transmitting a paging request message to one or more base stations serving cells within the location area; receiving an acknowledgement of one of the one or more base stations, the acknowledgement indicating that the terminal is located in a certain cell within the location area; and transmitting the downlink data to the one of the one or more base stations for enabling forwarding of the downlink data to the terminal.

Further preferred embodiments are presented by the dependent claims.

Embodiments of the invention further relate to a base station for a cellular communications network, wherein the base station comprises at least one transmission coordinator device as described above.

Finally, embodiments of the invention relate to a method of operating a transmission coordinator device as described above.

The principle of the UE centric tracking area as described herein may be only employed in particular operational scenarios such as e.g. depending on specific traffic types handled by (e.g., transmitted to and/or received from) a terminal. For example, the principle may be particularly beneficial if applied in such operational scenarios where the terminal handles low-rate, especially sporadic, traffic as typically generated by a user of the terminal being involved in instant messaging applications or the like, whereas for high-data rate applications such as media streaming, conventional handover mechanisms may be relied upon.

BRIEF DESCRIPTION OF THE FIGURES

Further features, aspects and advantages of the present invention are given in the following detailed description with reference to the drawings in which.

DESCRIPTION OF THE EMBODIMENTS

Figure 1:
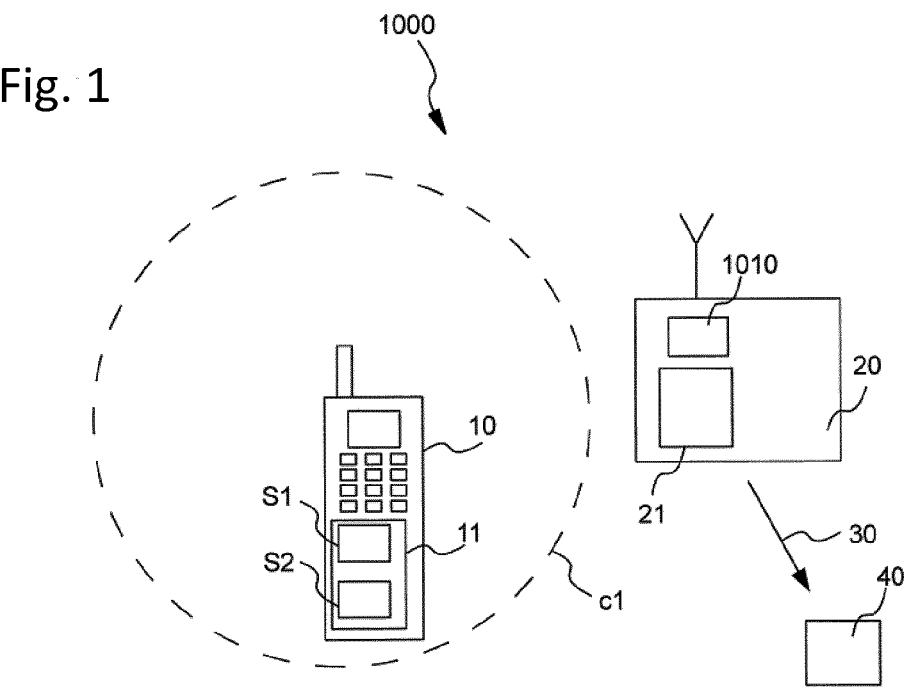
FIG. 1 schematically depicts a cellular communications network with a terminal according to an embodiment.

FIG. 1 schematically depicts a cellular communications network 1000. A terminal 10, which may be a mobile terminal such as a smartphone or the like, is depicted moving within a radio cell c1 provided by a base station 20 of the network 1000. The base station 20 serves the terminal 10 in a per se known manner by providing the radio cell c1 as well as (optionally) further radio cells, which are not depicted for the sake of clarity in FIG. 1. According to some embodiments, the base station 20 may exchange data, cf. the arrow 30, with further devices 40 which will be explained below in further detail.

The terminal 10 comprises a processing unit 11 such as e.g. a microcontroller or digital signal processor or the like which may control an operation of the terminal 10 in a per se known manner. Also, the processing unit 11 may be configured to perform aspects of the method according to the embodiments as explained below.

The base station 20 may also comprise a processing unit 21 such as e.g. a microcontroller or digital signal processor or the like which may control an operation of the base station 20 in a per se known manner. Also, the processing unit 21 may be configured to perform aspects of the method according to the embodiments as explained below.

Figure 2A:
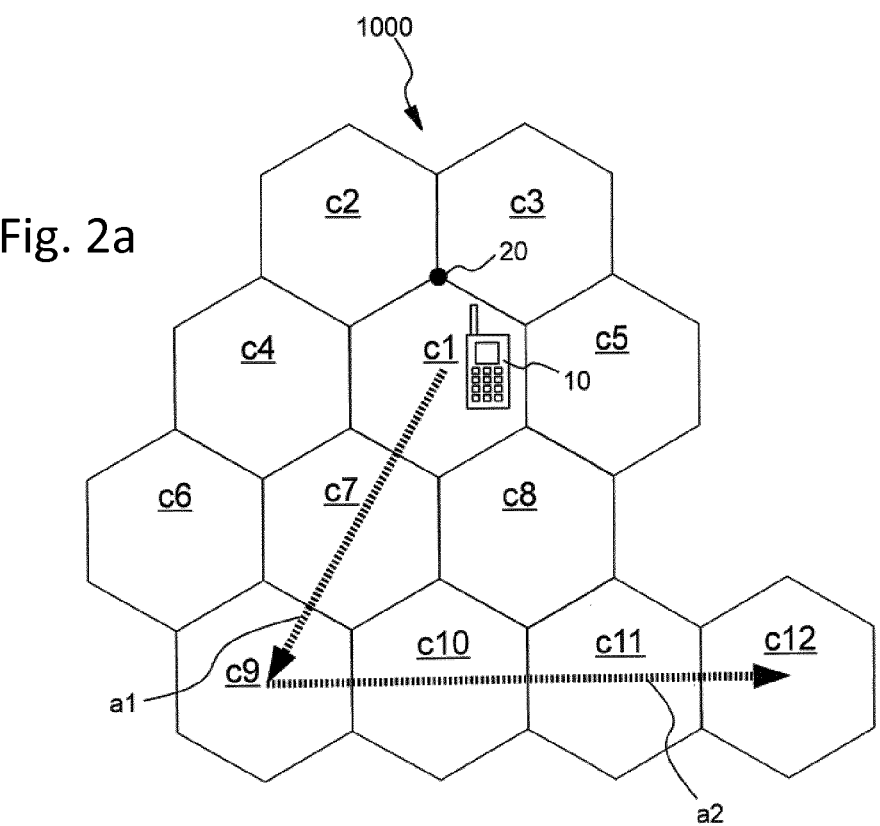
FIGS. 2a, 2b, 2c, and 3 depict various operational scenarios according to embodiments.

FIG. 2a schematically depicts an operational scenario of the terminal 10. In contrast to the simplified depiction of FIG. 1, FIG. 2a additionally depicts further radio cells c2, c3, c4, c5, c6, c7, c8, c9, c10, c11, c12. Presently, the base station 20 provides the three radio cells c1, c2, c3 in a per se known manner, the cells c1, c2, c3 e.g. corresponding to three "sectors" of an overall radio coverage area provided by the base station 20. Likewise, the further cells depicted by FIG. 2a may be provided by further base stations (not shown) of the network 1000. The arrows a1, a2 in FIG. 2a indicate that terminal 10 is moving within the coverage area of the radio cells c1, . . . , c12. Arrow a1 indicates a substantially linear movement of the terminal 10 from the present radio cell c1 through cell c7 to cell c9. After that, arrow a2 indicates a similar movement through cells c10, c11 to cell c12.

Figure 2B:
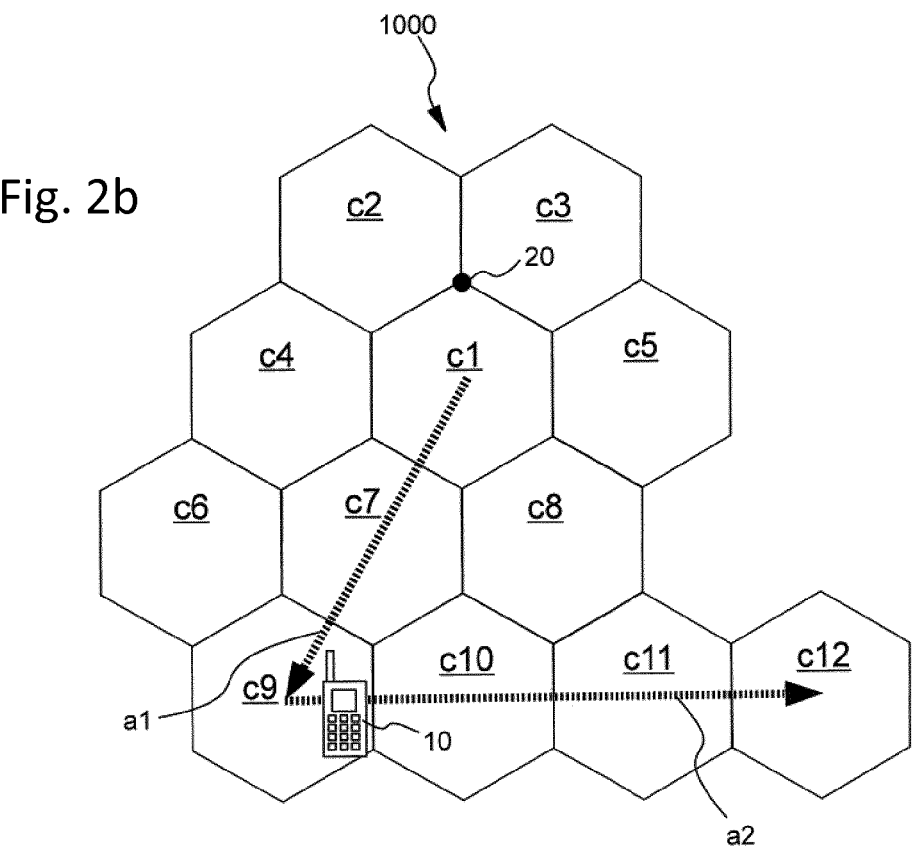
Figure 2C:
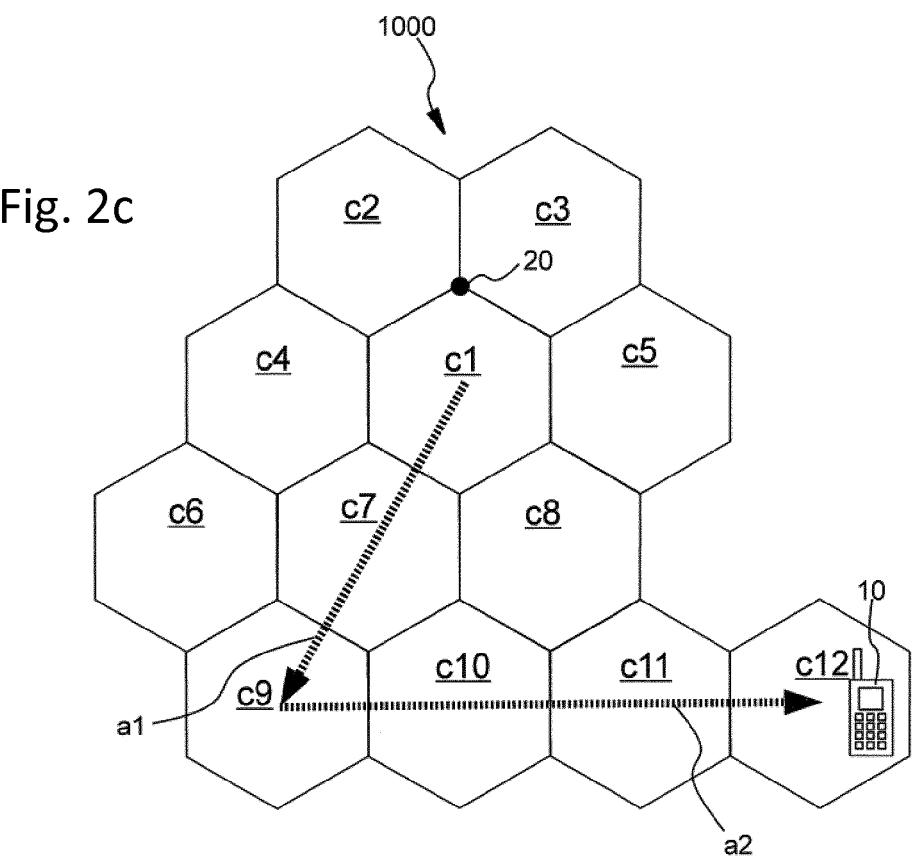

FIG. 2b depicts the terminal 10 as arrived within cell c9, whereas FIG. 2c depicts terminal 10 as arrived within cell c12.

Figure 3:
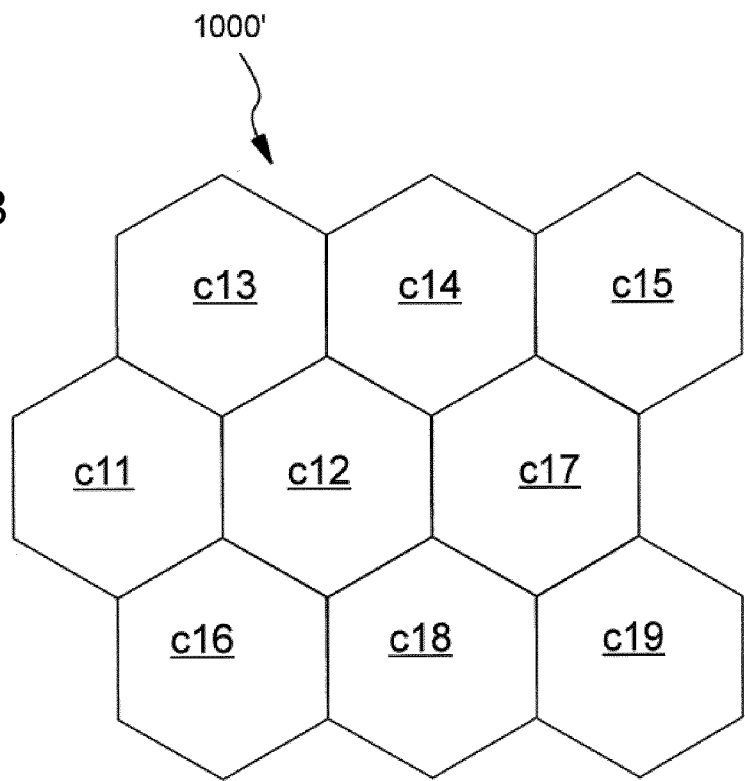

Further neighboring radio cells c13, . . . , c19 with respect to cell c12 are depicted by FIG. 3, the further neighboring radio cells c13, . . . , c19 depicting a further portion 1000' of the cellular communications network 1000 (FIG. 2a).

Figure 4:
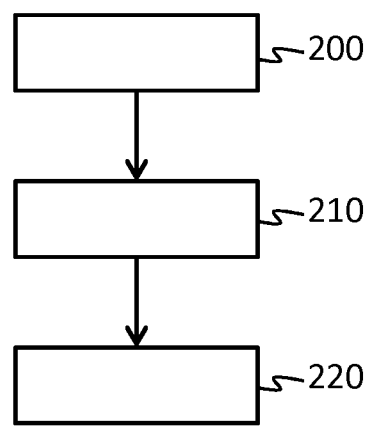
FIG. 4 schematically depicts a simplified flow chart of a method according to an embodiment.

FIG. 4 schematically depicts a simplified flow chart of a method according to an embodiment.

In a first step 200, terminal 10 (FIG. 2a) maintains a first set of at least n radio cells of the communications network 1000. The parameter n is equal to or greater than 3. In the present example n=11. A quality measure value of each of the n radio cells, the quality measure depending on a received signal power associated with reference signals transmitted in the cells and received by the terminal 10, exceeds a threshold. In the presently described exemplary embodiment, only radio cells c1, . . . , c11 have a quality measure value that exceeds the threshold and are thus comprised within the first set of radio cells. That is, radio cell c12 is not part of the first set of radio cells according to the presently described exemplary embodiment.

The threshold may be chosen depending on the value of parameter n. For example, if n=11, the threshold may be chosen such that exactly 11 radio cells exceed the threshold.

In some embodiments, when initializing terminal 10 within the communications network 1000, for example in radio cell c1 as depicted in FIG. 2a, prior to maintaining the first set of radio cells (action 200), the terminal 10 may determine the n radio cells having a quality measure value that exceeds the threshold, e.g. by per se known radio measurements. For example, terminal 10 may perform measurements of a reference signal receive power (RSRP) of various neighboring cells c2, c3, etc, and may select the radio cells with the n best RSRP values. The terminal 10 then reports the n radio cells to the base station 20 and/or to another device being part thereof or associated therewith, e.g. a transmission coordination device 1010 as schematically depicted in FIG. 1. The base station 20 and/or the other device may then establish set of cells corresponding to the first set. The set of cells being established contain the n radio cells reported by the terminal 10, but may further include further radio cells added in view of knowledge about the communication network and/or terminal. For example, the base station 20 or further device may add a further cell to the n radio cells if the further cell is generated by a base station generating one or more radio cells that are part of the n radio cells reported by the terminal 10. Similarly, a further cell may be added if its geographic location is such that inclusion in the to be established set of radio cells forms a coverage area without, or with limited, gaps. Additionally, or alternatively, knowledge about the geographical location of the terminal may be taken into account to select potentially relevant radio cells to be included in the to be established set of radio cells. After establishment of the set of radio cells, the established set of radio cells is reported to the terminal 10. Upon receipt of the established set of radio cells corresponding to the first set the terminal 10 may proceed with aforementioned maintaining (action 200).

Subsequently, the terminal 10 determines whether a quality measure value of a further radio cell c12, which is not comprised in the first set of radio cells, exceeds the quality measure value of the radio cell comprised in the first set with the m-th best quality measure value by a predetermined amount, where m ranges from 1 to n−1 (action 210). Preferably, the parameter m equals 1, which means that the quality value of the radio cell comprised in the first set with the best quality measure value is to be exceeded by the quality measure value of the further radio cell c12. The predetermined amount represents an offset. The predetermined amount may be equal to zero. An example of abovementioned condition would be the occurrence of Event A3 in Long Term Evolution (LTE) as defined by TS 36.331. In this case radio cell c12 would qualify as neighbor, while the radio cell with the m-th best quality measure value would qualify as primary cell, PCell. It must be noted that a terminal typically performs quality measurement, e.g. RSRP measurements repeatedly (e.g., periodically or sporadically or according to a temporal random or pseudorandom pattern). It may however take a while before the terminal 10 eventually detects radio cell c12 and it could take even longer before the terminal determines that the quality measure value of radio cell c12 fulfils abovementioned criterion. In the mean time, the terminal 10 may refrain from sending measurement reports, while maintaining the first set of radio cells, which may result in reduced signaling over the air interface between the terminal 10 and its serving base station 20.

If the quality measure value of the further radio cell c12 exceeds the quality measure value of the radio cell comprised in the first set with the m-th best quality value by the predetermined amount, the terminal 10 may arrange modification (action 220) of the first set of radio cells, whereby a second set of radio cells is obtained. The second set of radio cells comprises the further radio cell c12.

The terminal 10 may arrange modification by reporting the further radio cell c12 to the base station 20 and/or to another device being part thereof or associated therewith, e.g. a transmission coordination device 1010 as schematically depicted in FIG. 1. In response, the terminal 10 may then receive a further established set of cells corresponding to the second set. Formation of the further established set may be established in a similar fashion as establishment of the established set discussed previously.

Preferably, arranging modification of the first set comprises determining a plurality of radio cells with a quality measure value exceeding a further threshold. The further threshold may be equal to the threshold discussed previously. However, the further threshold may have a different value. For example, if the threshold value is set to value so that a maximum number of radio cells exceed it, the threshold value may vary in dependence of radio transmission conditions and/or quality of surrounding radio access nodes, such as base stations. The terminal 10 then reports the plurality of radio cells to a base station 20 and/or to another device being part thereof or associated therewith, e.g. a transmission coordination device 1010 as schematically depicted in FIG. 1. In response, the terminal 10 may then receive a further established set of cells corresponding to the second set. Formation of the further established set may be established in a similar fashion as establishment of the established set discussed previously.

The above-explained procedure advantageously enables to avoid frequent handovers as known from conventional systems, which are particularly inefficient for low data rate or even sporadic traffic from/to the terminal 10. In contrast to conventional signaling procedures involved in handover processes, which require numerous signaling messages whenever a terminal moves from one cell to a neighboring radio cell, such signaling now only has to be performed if a radio cell that is not within the first set has a quality measure value that exceeds (most of) the quality measure values of radio cells within the first set. Such signaling thus occurs much less frequent, thus not overburdening the air interface between terminal 10 and the base station 20.

Some embodiments will be explained in further detail below with reference to the figures.

Assuming that the terminal 10 is initially switched off and thus not connected to the network 1000, after switching the terminal 10 on, the terminal 10 measures a quality measure value of radio cells of the communications network 1000, and determines n (in this exemplary embodiment n=11) radio cells with a quality measure exceeding a threshold. The n radio cells are reported to the base station 20, and in response the terminal receives an established set of cells, i.e. a first set S1. The first set S1 may be in a storage device, such as a memory, of the terminal 10. The storage device may be part of the terminal 10, but may also be a separate module communicatively coupled to the processing unit 11.

Figures 5A, 5B, 6:
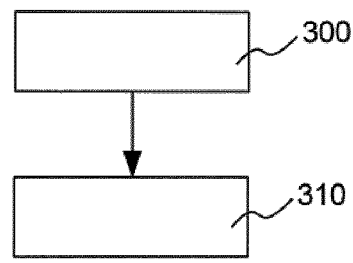
FIGS. 5a, 5b schematically depict tables representing sets of radio cells according to further embodiments.
FIG. 6 schematically depicts a simplified flow chart of a method according to a further embodiment.

FIG. 5a exemplarily depicts an ordered table representing the first set S1 of radio cells. In a first column col1 the cell identifier c1, c2, c3, . . . is depicted. In a second column col2, the associated quality measure value q1, q2, q3, . . . for each cell c1, c2, c3, . . . is depicted.

I.e., an initial determination of the first set S1 of radio cells yields the table according to FIG. 5a, wherein a quality measure value q1 has been determined for the first cell c1, and so on. For example, a reference signal receive power (RSRP) as known from conventional LTE systems may be used as a quality measure.

As is well known, usually those radio cells which are close to the geographic position of the terminal 10 are associated with comparatively large RSRP values. However, this is not necessarily the case in radio environments with poor line of sight (LOS) conditions, i.e. environments with a high degree of multi-path propagation due to reflections and the like.

If a terminal 10 is moving through the network 1000, for example as indicated by arrow a1 in FIGS. 2a-2c, the terminal 10 may from time to time, i.e. periodically, perform quality measurements of radio cells it can detect. If the terminal 10 detects a radio cell that is not present in the current set of radio cells, i.e. radio cell c12 in FIGS. 2a-2c, and determines that the quality measure value, e.g. a RSRP value, of the further radio cell c12 presently not comprised in the first set S1 exceeds the quality measure value of the radio cell within the first set S1 with the m-th best quality, parameter m ranging from 1 to 10 in this example (as n=11), an update of the set of radio cells is needed, and the terminal 10 will arrange modification of such cell. This may mean that the terminal 10 informs the base station about the further radio cell c12, but preferably the terminal 10 sends a measurement report identifying all radio cells with a quality measure value exceeding a further threshold. In response, the terminal 10 then receives the second set S2 from the base station 20, the second set S2 including the further radio cell c12.

Preferably, the parameter m in abovementioned scheme is chosen to equal one, m=1. In such case, if the predetermined amount is taken to be zero, the quality measure value of radio cell c12 in abovementioned example thus needs to be greater than the quality measure value with the best quality measure value within said first set S1. This may still be cell c1 as indicated in FIG. 5a. However, it may also be that measurements taken by the terminal while moving along the trajectory a1, a2 the quality measure values of the cells within the first set S1 have been entered into the list, which highly likely changed the respective quality measure values. For example, if the terminal has updated the quality measure values within the set S1 just prior to entry into the further radio cell c12, it is highly likely that the cell with the best quality measure value is cell c11.

An example of the second set S2 is depicted in FIG. 5b. The further cell c12 may be positioned in line of the table S2 corresponding to its quality measure value, so that the second set S2 again comprises an ordered list or table of radio cells regarding their quality measure value.

The second set S2 of radio cells is exemplarily arranged in FIG. 5b in the form of a table having columns col3, col4 similar to the table of the first set S1 depicted in FIG. 5a. As can be seen from FIG. 5b, the radio cell c12 is positioned in the first line of the table of FIG. 5b because it has the highest associated quality measure value q12. This may correspond to a scenario where the terminal 10 is located within radio cell c12, i.e. a scenario schematically depicted in FIG. 2c.

So, while the terminal 10 was moving along the paths a1, a2, i.e. prior to arriving within cell c12, the terminal 10 has passed numerous radio cells, i.e. cells c1, c7, c9, c10, c11. However, as all these cells are included in the first set S1 (see FIG. 5a) of radio cells, no modification of the set is needed, whatever quality measure value is measured. Along the trajectory, the terminal 10 may detect one or more further cells not being comprised in the first set S1. However, only upon arriving at cell c12, for the first time, a further radio cell, namely cell c12, is detected with a quality measure value that exceeds the quality measure value of the m-th best radio cell, m ranging from 1 to 10, and preferably being equal to 1. This triggers the modification as already explained above, wherein the second set S2 of radio cells is obtained.

In contrast to numerous handover signaling messages, which would have been required for conventional handover procedures during the roaming of terminal 10 through cells c1, c7, c9, c11, c12, if employing embodiments of above identified procedure, only for the roaming from cell c11 to cell c12 signaling with the base station 20 is needed to arrange for modification of the cell set. The size of the location area, i.e. also referred to as UE centric area, covered by the cells within a set may be chosen in such a way that updating occurs to achieve a minimum required precision regarding the location information of the terminal 10 at the network side, e.g. at the base station 20. If the size of the location area becomes greater, the number of set modifications will typically reduce. However, as the terminal 10 may not communicate with the base station while roaming through the area covered by the set, reaching the terminal 10, e.g. by means of paging, may become more cumbersome.

To enable a better tracking of the location of a terminal 10 within the area covered by the set of radio cells, the terminal 10 may, upon entry of a new cell that is present within the first set of cells, send a short message to the base station providing said cell indicating that this cell is now its best serving cell. Such best serving cell notification may take the form of a short data packet (SDP), and introduces very little signaling in comparison to a full handover signaling sequence.

Evidently, after obtaining the second set S2 of radio cells, a terminal 10 confronted with yet another radio cell, i.e. a cell not being in the second set S2, a quality measure value of which exceeds the quality measure value of the radio cell in the second set S2 with the m-th best quality measure value may be modified as with the above-explained transition from set S1 to set S2, and so on.

Note that the terminal 10 may alter the parameter n and/or the parameter m, preferably depending on quality measure measurements, such as RSRP measurements, and/or an operational state of the terminal 10 and/or the type and/or data rate (e.g., mean data rate) of traffic handled by the terminal 10.

A further aspect of the embodiments is embodied by a transmission coordinator device 1010, which may e.g. be implemented within a base station 20 as schematically depicted in FIG. 1. The transmission coordinator device 1010 receives (cf. action 300 in the flow chart of FIG. 6) from a terminal 10 the n radio cells and/or plurality of radio cells forming a basis for the first set S1 and the second set S2 respectively. As will be understood, further pluralities of radio cells forming a basis for further sets in the fashion of the determining action 210 of FIG. 4, may be received by the transmission coordinator device 1010 as well.

In the embodiments described throughout this description, the terminal 10 preferably communicates with the core network via a so-called anchor base station. Typically, the anchor base station is defined during establishing a set to be sent to the terminal in response to the receipt of a plurality of radio cells triggered by the detection of a sufficiently strong cell previously not in the list previously provided to the terminal. Preferably, the anchor base station is then the base station providing the cell with the best quality measure value among the plurality of radio cells received from the terminal. For example, in the exemplary embodiment depicted in FIGS. 2a-2c, upon initialization of the terminal 10 within the communications network 1000, cell c1 Is the best radio cell (see e.g. FIG. 5a), and the base station providing this cell may then be defined as the anchor base station. Similarly, as follows from FIG. 5b, cell c12 is the best radio cell among the radio cells forming the basis for the second set S2. Consequently, replacement of the first set S1 by the second set S2 may be accompanied by a change of anchor base station, i.e. from the base station serving radio cell c1 to the base station serving radio cell c12. The transmission coordinator 1010 may form part of the anchor base station or may be communicatively coupled thereto. For downlink transmission, the transmission coordinator device 1010 may forward downlink data to be transmitted to the terminal 10 depending on such received sets S1 and/or S2 or the like thus advantageously exploiting the location information provided therein. That is, instead of broadcasting the downlink transmission in many radio cells, such broadcast may only be done in the cells forming part of the sets S1 and/or S2. In some embodiments, the terminal may communicate a best server notification message to the anchor base station each time it enters another radio cell among the current set. If the new cell is provided by a base station not being the anchor base station, the serving base station may forward such message to the anchor base station. The best server notification message merely indicates the presence of the terminal 10 within the cell and therefore requires less signaling than a handover. The best server notification message allows the anchor base station to keep track of the position of the terminal 10, and thus enables a terminal 10 to be provided with downlink information in a precise and efficient manner without requiring numerous handover signaling messages as defined in conventional systems.

Alternatively or in addition, the device 1010 may forward, cf. step 310 of FIG. 6, said downlink data to the terminal 10 via a radio cell associated with the last uplink traffic transmitted by the terminal 10.

Alternatively or in addition thereto, device 1010 may perform paging within a location area associated with the terminal 10, wherein said location area may be larger than a UE centric tracking area. Preferably, paging is done within the UE centric tracking area. Some embodiments of a method of paging with a UE centric tracking area will be discussed with reference to FIGS. 11 and 12.

Generally, according to an embodiment, a first transmission attempt by device 1010 may be performed within a best cell of the last established set e.g. cell c1 in the case of set S1 or cell c12 in the case of set S2. According to an embodiment, if these attempts for data transmission to terminal 10 have not been successful, it may be followed by scheduled data transmissions within k' surrounding cells or paging within k' surrounding cells and scheduled data transmission in one of the surrounding cells, k' being greater than 1.

If these further measures have neither been successful, i.e. the data transmission to the terminal 10 could not be performed, paging within the complete location area associated with the terminal 10 may be initiated by device 1010.

As mentioned above, the functionality of the device 1010 may e.g. be integrated into one or more base stations 20, 40 of the communications network. Additionally, established sets of radio cells, such as set S1 and S2 as discussed with respect to the embodiments described above, may be forwarded to other devices 40 such as e.g. neighboring bases stations or the like.

Further aspects and advantageous embodiments of above-described principle are explained below.

According to Applicant's considerations, the above described principle is particularly beneficial for implementing 5G (fifth-generation) mobile communications networks, because different kind of handovers could be supported by providing the principle. As an example, for terminals engaged with high data volumes, e.g. video steaming or continuous transmissions, e.g. voice over 5G conventional handover (HO) processes or advanced HO processes derived therefrom may be applied, whereas for terminals engaged with sporadic small data services, e.g. for instant messaging, the principle as exemplified by the process of FIG. 4 may be applied. The latter advantageously enables a new mobility concept which avoids "unnecessary" UE (user equipment) measurement reporting and handover signaling in an active state of the terminal 10 as long as the terminal 10 is moving within a specified area, e.g. within the coverage area of a set S1, S2 of radio cells explained above, which may also be denoted as a UE centric tracking area.

A decision which handover mode (conventional or according to an embodiment of abovementioned principle) should be applied may be controlled by a base station 20 or a radio cloud by configuration of the mobile terminal 10 with respective handover settings.

Similar as described previously with respect to FIG. 2a, a mobile terminal (UE) 10 may report after an initial access to the network the best (currently serving) cell and e.g. up to 8 surrounding cells. If no further cells are included at the network side, the UE centric tracking area would then thus consist of n=9 radio cells. Preferably, as long as the mobile terminal 10 moves within the coverage area of the UE centric tracking area no measurement report will be transmitted.

If the terminal 10 detects that a new radio cell, not belonging to the set of 9 cells as defined above, having a quality measure value exceeding a certain threshold value, a new UE centric tracking area is defined by the mobile terminal. The certain threshold value may depend on the quality measure values of other cells within the set of 9 cells. For example, the terminal 10 may define a new UE centric tracking area is the quality measure value of the new cell exceeds the highest quality measure value of the cells in the set of 9 cells, i.e. if the new cell qualifies as a "best" cell.

In some embodiments, the mobile terminal than transmits the new measurement report with new UE centric tracking area to the base station 20. In other embodiments, such updated measurement report is merely sent when the mobile terminal 10 moves outside the coverage area of the previously transmitted measurement report defining the "outdated" UE centric tracking area.

As described above a User Equipment (UE) centric area, which also may be referred to as UE-centric moving tracking area (MTA) or user-centric connection area, may be defined as a set of cells allocated by a radio access network (RAN), e.g. a 5G-RAN, the cells fulfilling one or more predetermined criteria. The UE-centric MTA is typically controlled by the RAN on the basis of measurements executed by the UE. Preferably, the UE takes measurements, but merely reports these measurements actively to the RAN if it moves to a cell that is not present in the current UE-centric MTA. However, if a UE moves from a cell within the UE-centric MTA to a cell that is not present in the current UE-centric MTA, the UE informs the RAN, and the RAN updates the UE-centric MTA. Note that in order to complete such update, other entities, such as Evolved Packet Core (EPC) entities like a mobility management entity (MME), merely need to be involved if a new anchor base station has been defined. As the UE does not automatically report transfer from one cell to another cell, when moving within the UE-centric MTA, the number of signaling messages may be reduced significantly. In particular, as follows from the previous discussions, the use of a UE-centric MTA allows for minimization of connection setup signaling and handover signaling. However, it would be preferable if radio resource control (RRC) signaling could be reduced as well.

Figure 7:
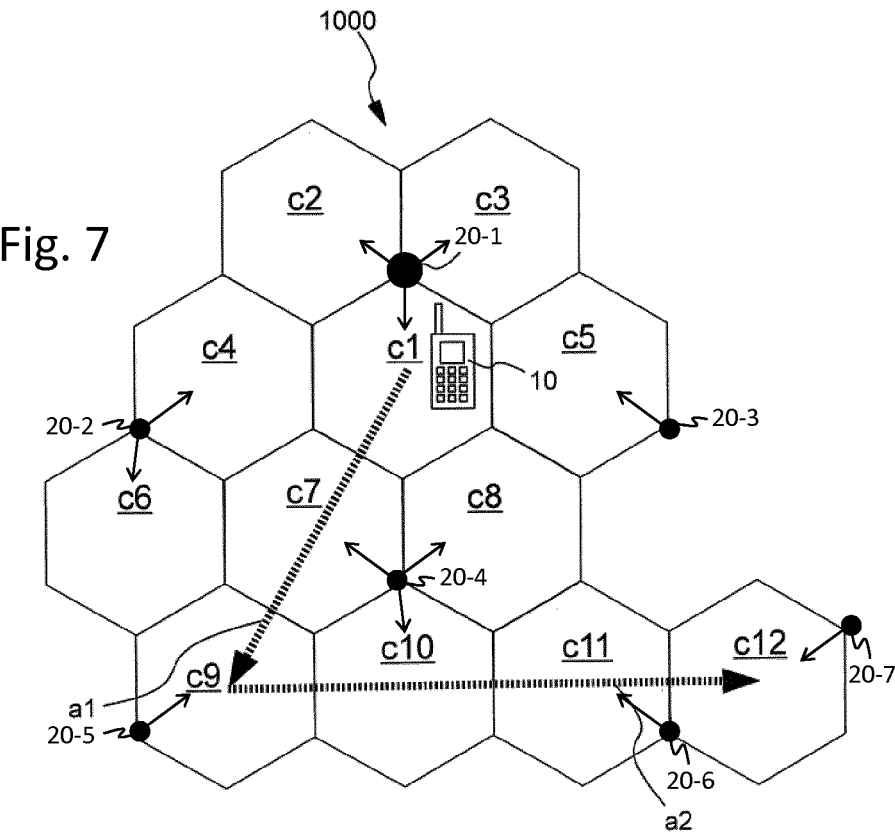
FIG. 7 depicts an operational scenario according to an embodiment.

As already mentioned previously, the MTA may be realized via a mobility anchor, or anchor base station, which forms a connection between the UE within the UE-centric MTA and the network. FIG. 7 is similar to FIG. 2a in that it depicts a mobile terminal 10 located within a UE-centric MTA formed by cells c1-c11, but now also schematically depicts the base stations providing the respective cells. In particular, cells c1, c2 and c3 are provided by base station 20-1, cells c4 and c6 are provided by base station 20-2, cell c6 is provided by base station 20-3, cells c7, c8 and c10 are provided by base station 20-4, cell c9 is provided by base station 20-5 and cell c11 is provided by base station 20-6. Cell c12, which is initially not part of the UE centric MTA is provided by base station 20-7.

Typically, the base station that configures the UE within the MTA plays the role of anchor base station. In the shown embodiment, while the UE 10 is activated within cell c1, base station 20-1 plays the role of anchor base station. Typically, evolved packet system/core (EPS/EPC) connections, if present, are terminated at the anchor base station.

The anchor base station 20-1 may assign a temporary radio network identifier to the UE 10. The temporary radio network identifier may be a cell radio network temporary identifier (C-RNTI), as known in the art. Preferably, however, a temporary radio network identifier is given that is uniquely defined throughout the UE-centric MTA, i.e. a moving tracking area radio network temporary identifier (MTA-RNTI). The MTA-RNTI may serve as the key with which the radio cells within the UE-centric MTA identify the terminal 10 and the anchor base station associated therewith. The anchor base station 20-1 may further provide one or more further parameters, such as Physical Cell ID (PCI) of the anchor base station cell, a security key, a discontinuous reception (DRX) configuration and a System Architecture Evolution Temporary Mobile Subscriber Identity (S-TMSI). The temporary radio network identifier, such as the MTA-RNTI, together with the one or more further parameters then forms a UE-context. The UE-context is preferably communicated to other base stations, if any, within the UE-centric MTA, such that it is known within all cells of the UE-centric MTA. As a result, the UE is recognized in any one of the cells within the UE-centric MTA, and the UE-context does not have to be changed as long as the UE remains within the UE centric tracking area.

In a long-term evolution (LTE) network, typically the network uses a radio resource control (RCC) timer to control transitions of a UE between an active state, referred to as RRC_Connected state, and an idle state, referred to as RRC_Idle. The network monitors the UE activity in active state and if there is no data for the UE in downlink or uplink during the timer period, the network switches the UE from active to idle state. In order to minimize a baseband board of the base station and to reduce active mode signaling, typical timer values are typically set to about 10 seconds, and in higher loaded radio cells may be set down to 2-4 seconds. However, each RRC state transition is associated with a large amount of air-interface signaling. The use of a UE-centric MTA allows for an approach in which the RRC timer is set to higher values. Where under normal circumstances such higher values typically result in an increase of handover signaling (as the UE remains in active state for a longer period of time), such increase of handovers will now be limited in view of the UE centric MTA concept described above.

In some embodiments, the amount of RRC state transitions between RRC_Connected state and RRC_Idle may be reduced for a UE 10 operating within a UE-centric MTA. In such embodiments, the RRC_Connected state may include two (sub-)states, i.e. a UE-centric mobile tracking area enabled state, hereinafter also referred to as MTA-Enabled, and a UE-centric mobile tracking area disabled state, hereinafter also referred to as MTA-Disabled. The MTA-Disabled state is similar to the present day LTE-RRC_Connected State. A UE actively engaged within the UE-centric MTA operates in MTA-Enabled state. However, upon receipt of UE related information and/or an event triggered UE measurement report or if no radio activity is observed for a certain period of time, instead of sending a UE in RRC_Idle, the base station may decide that the UE should switch to the MTA-Disabled state instead. Similarly, a base station may decide that a UE operating within MTA-Disabled state should switch towards MTA-Enabled state upon receipt of UE related information and/or an event triggered UE measurement report if a timer related to UE-radio inactivity terminates, whereas such termination of a radio inactivity timer would normally result in a UE-configuration towards Idle_State in a present day LTE communications network.

Figure 8:
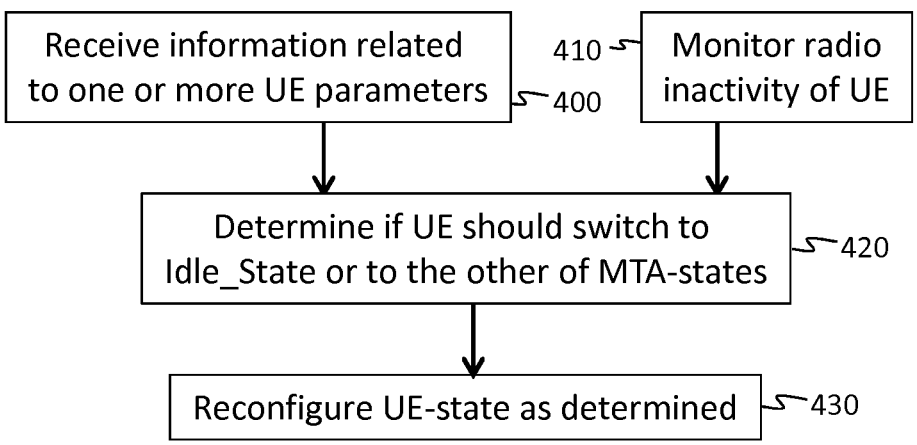
FIG. 8 shows a flow chart of a method for determining a need for changing operational state of a mobile terminal according to an embodiment.

FIG. 8 shows a flow chart of a method for determining, at a base station, whether a UE configured in one of the MTA-states should switch to Idle_State or to the other of the MTA-states. That is, if the UE is configured in MTA-Disabled state, the method describes a method of determining whether a UE should switch to Idle_State or to MTA-Enabled state. Similarly, if the UE is configured in MTA-Enabled state, the method describes a method of determining whether a UE should switch to Idle_State or to MTA-Disabled state.

First, the method includes receiving information related to one or more UE parameters (action 400). Such UE parameters may be one or more of UE category, one or more aspects of a UE-profile, such as Quality of Service, Traffic, Speed, and an anticipated deployment scenario. Such information may also include a UE measurement report, which may be event triggered.

Additionally, the method further includes monitoring radio inactivity of the UE (action 410). Such monitoring may be executed with the help of a downlink buffer or an uplink buffer status report. Alternatively, such monitoring may be executed by using a timer, such as an RRC-timer.

If the radio inactivity of the UE exceeds a predetermined threshold, the method further includes determining whether the UE should switch to Idle_State or to the other of the MTA-states based on the received information related to one or more UE parameters (action 420). An example of a UE parameter is the UE category. For example, if the terminal is known to be a sensor which transmits data at predefined points in time, while not sending any further information in between, such terminal may be sent to Idle_State relatively quickly. Other examples of UE parameters that may play a role are historic UE behavior, buffer profile and UE speed.

Finally, the base station configures the UE as determined (action 430).

Figure 9A:
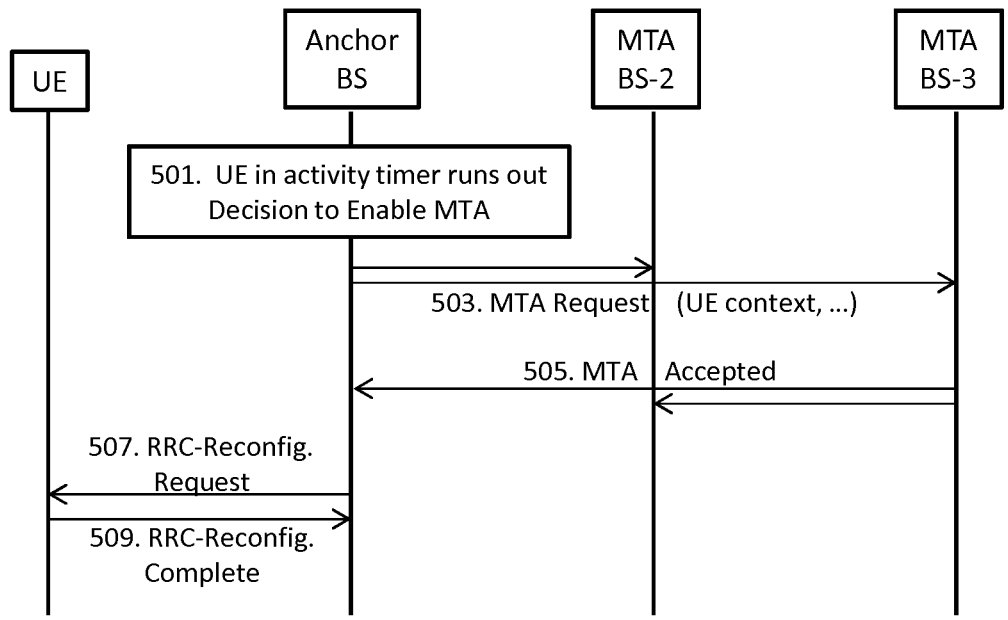
FIGS. 9a-9c depict message exchange diagrams for switching of a user terminal configuration between different operational states according to embodiments of the method of FIG. 8.
Figure 9B:
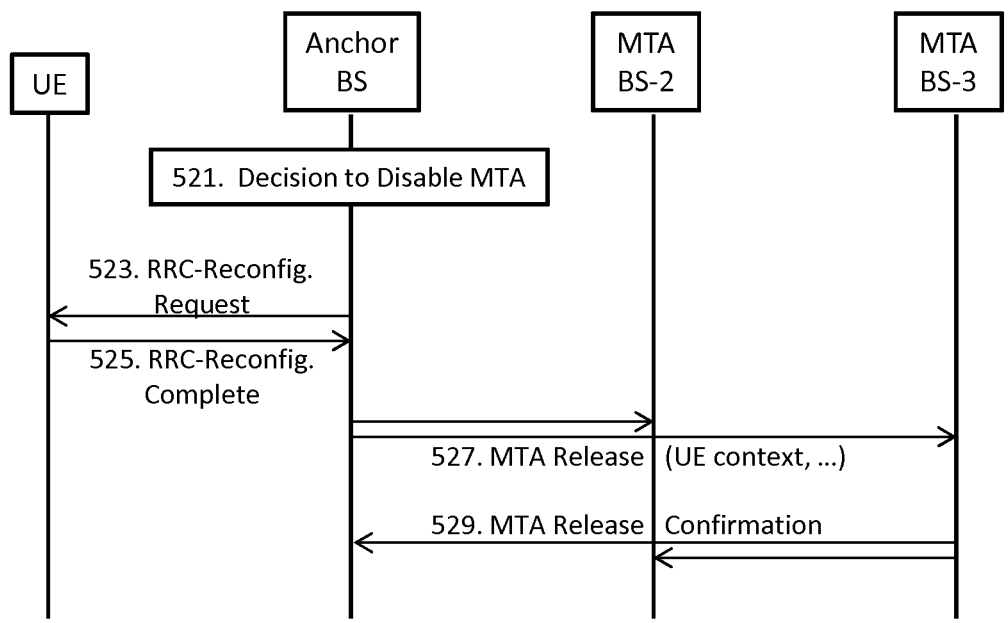
Figure 9C:
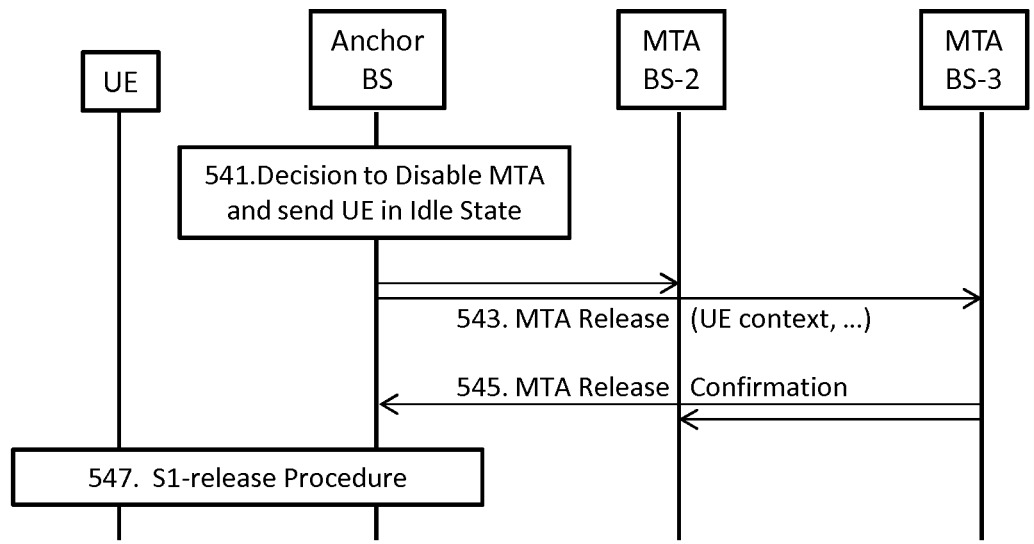

FIGS. 9a-9c depict message exchange diagrams for the switching of UE-configuration between different states according to embodiments of the procedure of FIG. 8. In these message exchange diagrams a timer is used by the anchor base station to monitor radio inactivity of the UE. It will be understood that embodiments are not limited to the way of monitoring radio inactivity of the UE. Different methods for such monitoring may be used as well, such as using downlink and uplink buffer status reports.

FIG. 9a depicts a message exchange diagram for a UE switching from MTA-Disabled state to MTA-Enabled state. Initially, the UE is configured in MTA-Disabled state. If the UE-inactivity timer runs out, the anchor base station decides that the UE should switch to MTA-Enabled state (action 501). Following this decision, an MTA request message is sent to the other base stations, i.e. indicated as MTA BS-2 and MTA BS-3 in FIG. 9a, that are serving cells within the MTA (action 503). Such transmission may be executed over an X2-interface in a way as known in the art. If accepted, the other base stations respond by sending a MTA-accepted message to the anchor base station (action 505). The MTA request message preferably includes the UE-context. Alternatively, the UE-context may be sent to the base stations that have accepted the MTA request.

The anchor base station now reconfigures the UE using a RRC-reconfiguration procedure comprising the sending of a RRC-Reconfiguration Request (action 507), which, if successful, is followed by the receipt of a RRC-Reconfiguration Complete message (action 509).

FIG. 9b depicts a message exchange diagram for a UE switching from MTA-Enabled state to MTA-Disabled state. Initially, the UE is configured in MTA-Enabled state. If the UE-inactivity timer runs out, the anchor base station now decides that the UE should switch to MTA-Disabled state (action 521). Following this decision, the anchor base station now reconfigures the UE using a RRC-reconfiguration procedure comprising the sending of a RRC-Reconfiguration Request (action 523), which, if successful, is followed by the receipt of a RRC-Reconfiguration Complete message (action 525). Subsequently, an MTA release message is sent to the other base stations serving cells within the MTA (action 527). The MTA release message preferably includes the UE-context. If accepted, the other base stations respond by sending a MTA-Release Confirmation message to the anchor base station (action 529).

FIG. 9c depicts a message exchange diagram for a UE switching from MTA-Disabled state to Idle_State. After deciding that MTA should be disabled, a further decision may be made to send the UE to Idle_State (action 541). Following these decisions an MTA release message is sent to the other base stations serving cells within the MTA (action 543). The MTA release message preferably includes the UE-context. If accepted, the other base stations, i.e. MTA-BS2 and MTA-BS3 in FIG. 9c, respond by sending a MTA-Release Confirmation message to the anchor base station (action 545). The Anchor BS then initiates the S1-release procedure as known in the art, and therefore not described in detail (action 547).

As mentioned previously, for the transmission of new data in downlink to a UE, one may first attempt to transmit the data to a last reported best cell or to the last cell from which uplink traffic has been received, optionally followed by scheduled data within k' many surrounding cells or paging within k' surrounding cells, k' being greater than 1, and scheduled data in one cell, optionally followed by paging within the location area.

For transmission of data packets in the cell c1, preferably small data packets, a scheduled transmission of downlink and uplink data may be considered. An activity timer may be started in the anchor base station and/or the UE after reception or transmission of data is finalized. The UE may be switched by the anchor base station or based on its own timer to a low-overhead connected state, i.e. no PMI (precoding matrix indicator), CQI (channel quality indicator) reports. Such low-overhead connected state may correspond to the MTA-enabled state described previously.

For new data in uplink direction, a scheduling request may be sent towards the anchor base station, followed by a resource grant, or a connectionless transmission. A bearer service may be considered as being connectionless, if all switches/routers on a bearer path associated with said bearer service need not to be configured in advance of forwarding of a packet.

If the UE has moved towards a different cell within the UE-centric MTA without notifying the anchor base station, the UE may, if a new uplink transmission is desired, send a scheduling request to the currently best serving base station within the UE-centric MTA. If the best serving base station is not the anchor base station, the best serving base station may forward the scheduling request to the anchor base station, e.g. based on knowledge obtained via a UE-context shared within the UE-centric MTA. In response, the UE may receive a resource grant and send the uplink data. Alternatively, the UE may send the uplink data using a connectionless transmission.

The UE may thus contact any of the cells within the UE-centric MTA for uplink transmission. However, for downlink transmission, due to the fact that the UE does not necessarily provides its position to the anchor base station while moving between cells within the UE-centric MTA, paging may be necessary.

Figure 10A:
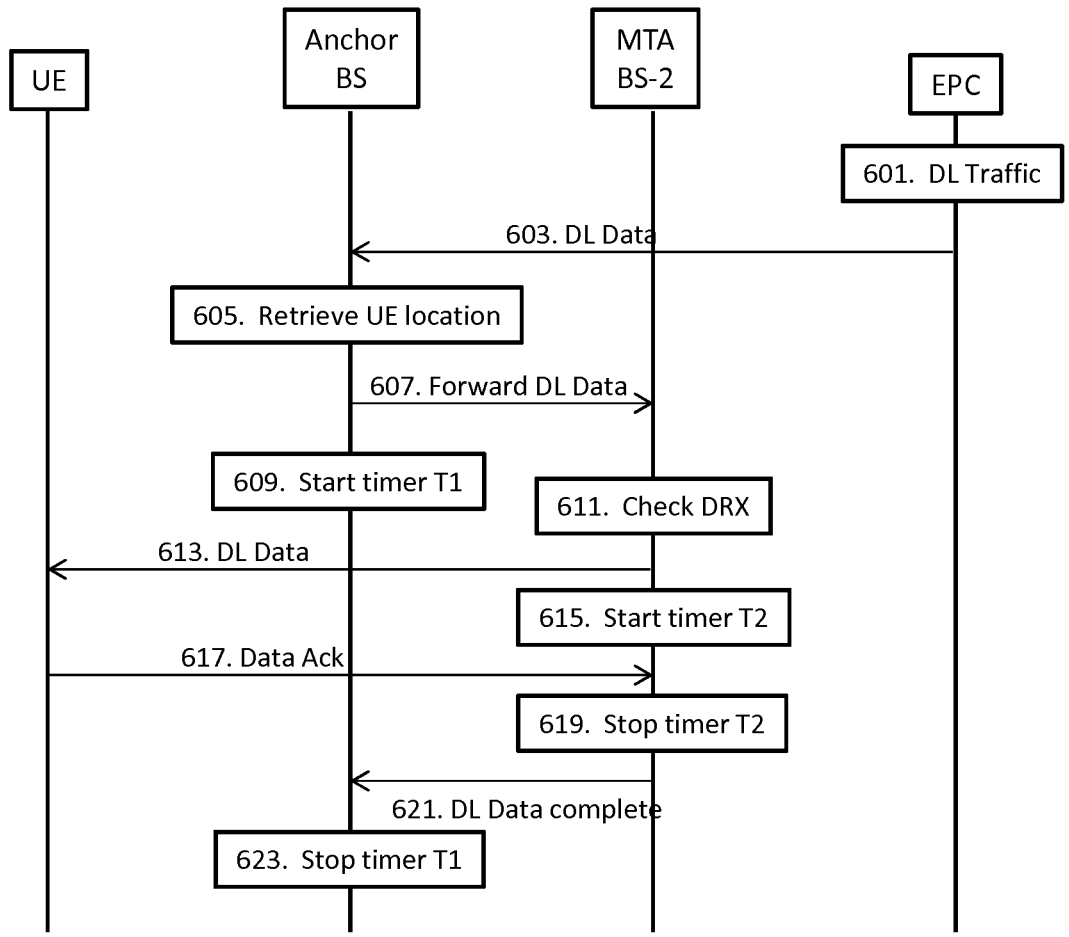
FIGS. 10a and 10b depict message exchange diagrams for establishing a downlink transmission.
Figure 10B:
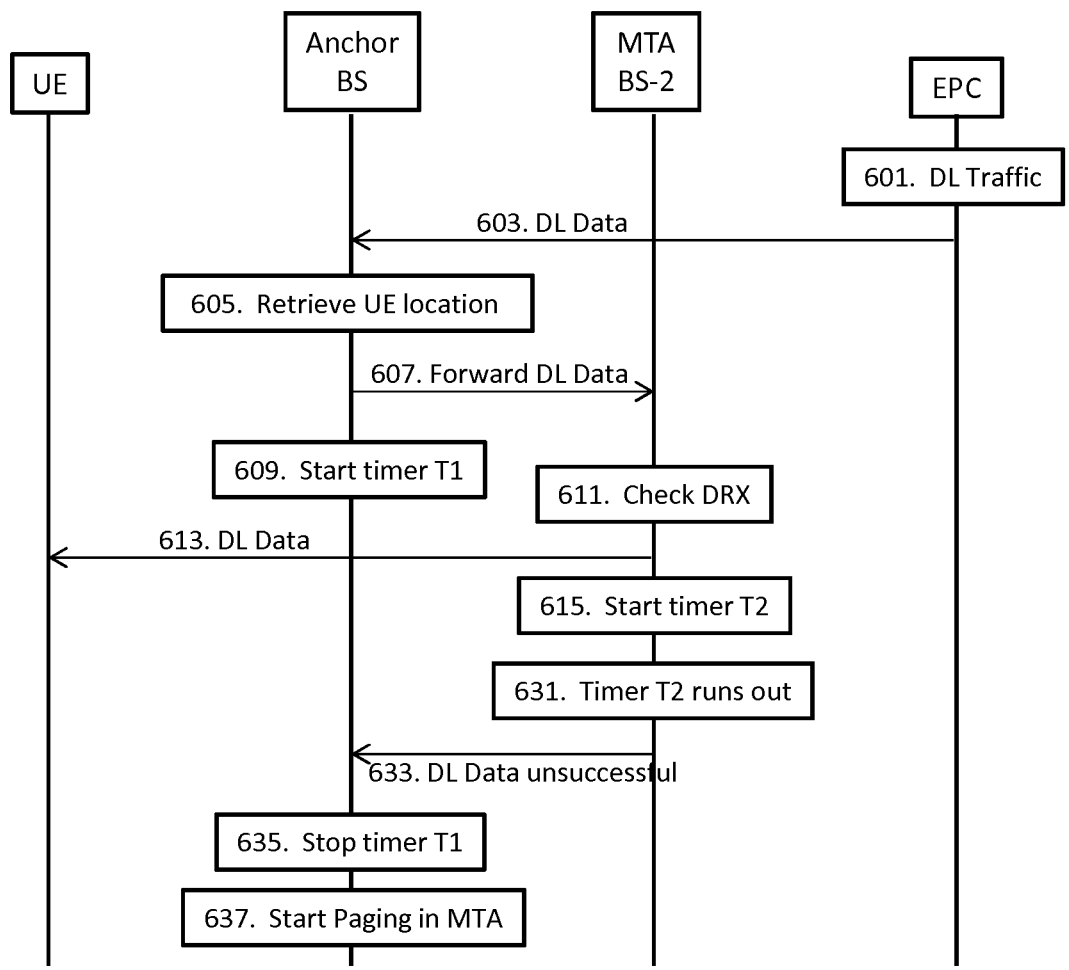

FIGS. 10a and 10b depict message exchange diagrams for establishing a downlink transmission within the UE-centric MTA concept described above. The difference between FIG. 10a and FIG. 10b is that the first shows a scenario in which the establishing is successful, whereas the latter shows a scenario in which the transmission fails. In these scenarios it is assumed that the anchor base station comprises a transmission coordinator device as described above with reference to e.g. FIG. 1.

In particular, in FIG. 10a, upon the availability of downlink traffic in the network, e.g. an Evolved Packet Core (action 601), EPC, the EPC transmits the downlink data to the anchor base station (action 603). The anchor base station then retrieves the UE location (action 605), typically the last location received from the UE, e.g. by means of a so-called best server indication, and forwards the downlink data to a further base station, i.e. the base station within the UE-centric MTA serving the cell corresponding to the last received UE location, i.e. MTA BS-2 in FIG. 10a (action 607). Of course, if the anchor base station is serving the cell of the last known UE location, this forwarding will not be necessary. Upon forwarding the downlink data a timer T1 is started at the anchor base station (action 609). Upon receipt of the downlink data the further base station schedules the downlink data for the UE according to its DRX configuration (action 611) and transmits the downlink data to the UE (action 613). Upon transmission, a timer T2 at the further base station starts (action 615). The UE responds to receipt of the downlink data by sending a data acknowledgment (action 617). Upon receipt of the data acknowledgment, the timer T2 is stopped (action 619), and a downlink data complete message is sent to the anchor base station (action 621). Upon receipt of the downlink data complete message the timer T1 is stopped (action 623).

In FIG. 10b, the transmission of the downlink data is similar to the procedure described with reference to FIG. 10a up to the point of forwarding the downlink data to the UE (action 613) and subsequent start of timer T2 (action 615). However, contrary to the scenario depicted in FIG. 10a, since the UE is no longer in the cell served by the further base station, no data acknowledgement message is received. Consequently, timer T2 runs out (action 631). As a result of the running out of timer T2, the further base station sends a downlink data unsuccessful message to the anchor base station (action 633). Upon receipt of this message, timer T1 is stopped (action 635). Furthermore, as the downlink data transfer was unsuccessful, the anchor base station starts paging within the UE centric MTA (action 637).

Such paging may be done in a "traditional" way, i.e. the anchor base station forwards the message that the downlink data transfer was unsuccessful to a MME which triggers paging to track the UE. The MME then transmits paging requests to all base stations that are believed to be possible candidates of serving the UE. In other words, it may be possible that the MME not only addresses base stations serving cells within the UE-centric MTA, but also other base stations.

Preferably, paging is however executed within the UE-centric MTA by the anchor base station without involving an external entity, such as an MME.

Figure 11:
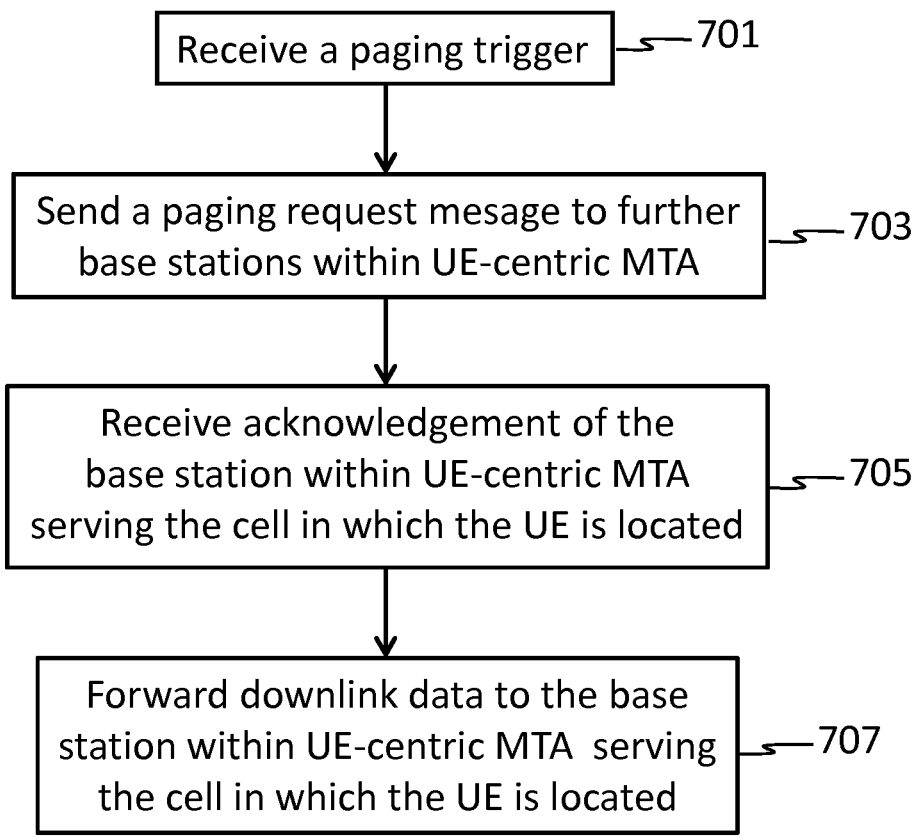
FIG. 11 shows a flow chart of a method for paging a mobile terminal according to an embodiment.

FIG. 11 shows a flow chart of a method for paging, at the anchor base station, e.g. using a transmission coordinator device therein, a UE within a UE-centric MTA. Upon receipt of a paging trigger (action 701), e.g. receipt of a downlink data unsuccessful message in the scenario depicted in FIG. 10b, the anchor base station sends a paging request message to the further base stations within the UE-centric MTA (action 703). If the UE is within the UE-centric MTA, the anchor base station receives an acknowledgment of one of the further base stations indicating that the UE is located in a certain cell within the UE-centric tracking area (action 705). The anchor base station then transmits downlink data to the further base station serving the cell in which the UE is located for enabling the forwarding of such downlink data to the UE by this further base station (action 707).

The paging request message may include a temporary radio network identifier of the UE to be paged, e.g. an MTA-RNTI.

The paging request message may further include an information element that can aid the UE to provide an appropriate response, e.g. one or more of a paging origin, paging trigger and paging entity.

The paging request message may further include an information element explicitly mentioning the response to be sent, e.g. latest measurement report or presence flag.

Depending upon the paging response, the paging request message may further include a suitable uplink access method, e.g. contention free access or a so-called Short Data Packet (SDP)-access. For contention free access uplink grants may be scheduled in the paging request message. In case of the use of presence flags contention based single shot access or connectionless access methods may be used up to downlink allocation.

If the UE is in MTA-Enabled state, a UE may process the paging request message in the following way. If the UE-identity in the paging request message, e.g. a MTA-RNTI, matches one of the UE-identities allocated by upper layers, check if the paging response information element in the paging request message is set to measurement report or simple indication, e.g. presence flag. If a measurement report is indicated, check the uplink access method indicated in the paging request message, forward the UE-identity, the paging entity and the uplink access method being indicated in the paging request message to upper layers, e.g. layer 3-RRC, and trigger transmission of a measurement report as paging response.

Figure 12:
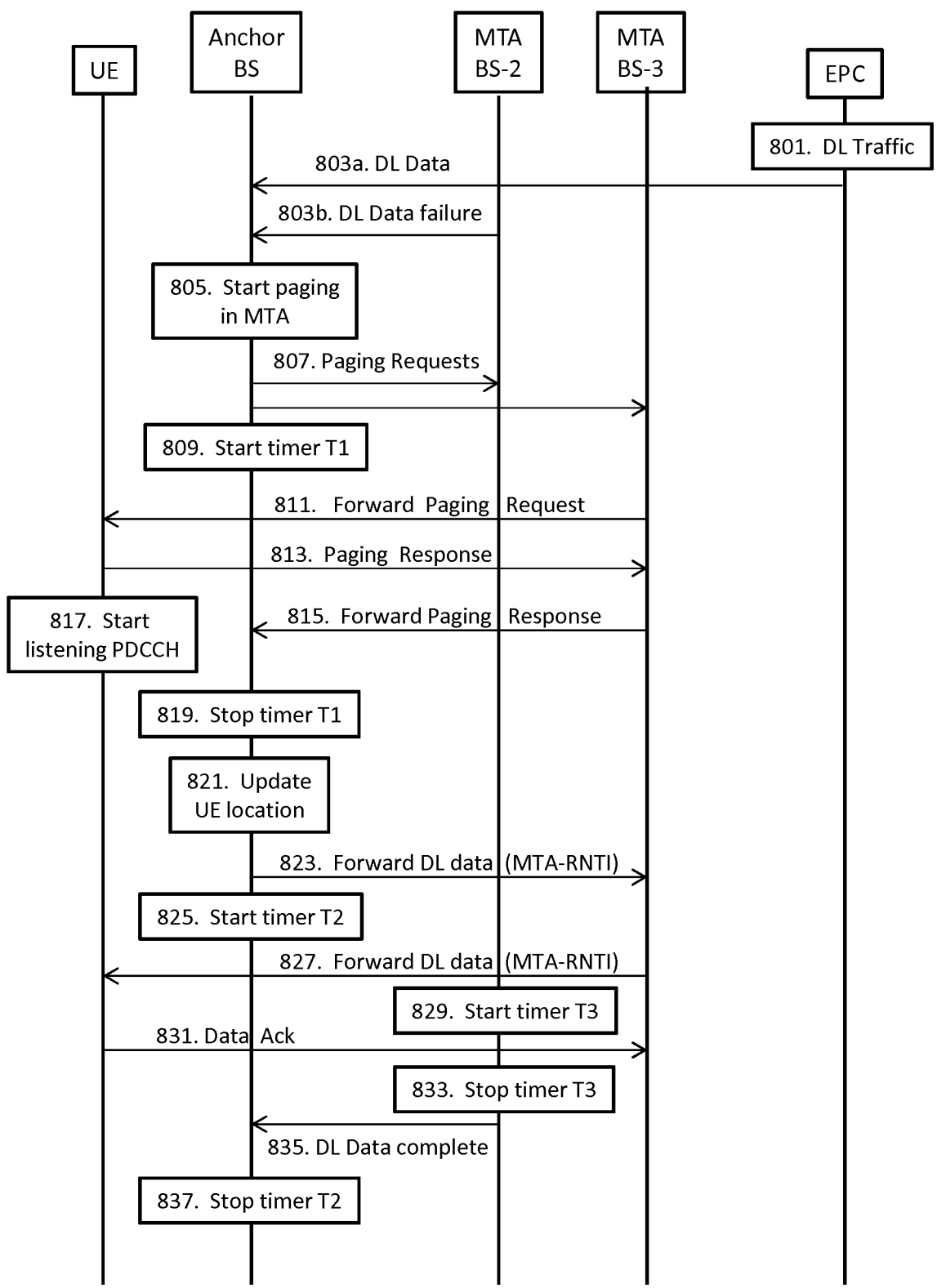
FIG. 12 depicts a message exchange diagram for paging a mobile terminal according to an embodiment.

FIG. 12 depicts a message exchange diagram for paging a mobile terminal according to an embodiment. In this message exchange diagram two possible paging triggers are indicated. First, upon the availability of downlink traffic in the network, e.g. an EPC (action 801), the EPC may transmit the downlink data to the anchor base station (action 803). The receipt of downlink data by the anchor base station may serve as a trigger to start paging (action 805). Alternatively, similar as for example described previously with respect to FIG. 10b, the anchor base station may receive a downlink data transmission failure message (in FIG. 12 from MTA BS-2; action 803b). The downlink data failure message may then serve as a trigger to start paging (action 805). The anchor base station may then send paging request messages to the base stations serving cells within the UE-centric MTA (action 807). The paging request messages may contain one or more of the information elements discussed previously. Upon sending the paging request messages a timer T1 is started at the anchor base station (action 809). The other base stations broadcast the paging request message in the one or more cells that they are providing, the paging request message being received by the UE if present within the UE-centric MTA, in FIG. 12 in a cell provided by further base station MTA BS3 (action 811). The UE sends a paging response message to the base station from which it received the paging request message (action 813). The further base station forwards the paging response message to the anchor base station (action 815). The paging response message may contain one or more suitable information elements, as discussed previously. After transmission of the paging response message the UE configures itself to be ready for receipt of downlink data, e.g. by listening to the physical downlink control channel, PDCCH (action 817). Upon receipt of the paging response message by the anchor base station the timer T1 is stopped (action 819). Additionally the anchor base station updates the UE location (action 821). The anchor BS then transmits the downlink data to the further base station serving the cell in which the UE is located, i.e. MTA BS3 in FIG. 12 (action 823). Preferably, the data is accompanied by a UE-identifier, such as a MTA-RNTI, to enable identification of the desired destination of the downlink data. Upon transmitting the downlink data a timer T2 starts at the anchor base station (action 825). The further base station forwards the downlink data it has received from the anchor base station to the UE (action 827). Upon forwarding the downlink data a timer T3 starts at the further base station (action 829). Upon receipt of the downlink data the UE sends a data acknowledgement to the further base station (action 831), which arrival at the further base station causes the timer T3 to stop (action 833). The further base station then sends a downlink data complete message to the anchor base station (action 835). Upon receipt of the downlink data complete message the timer T2 is stopped (action 837).

It follows from above discussion that embodiments of the invention may result in one or more of the following: reduced signaling (especially on the air interface and towards MME), and enabling efficient tracking of UEs, which is particularly efficient with small data packet services (e.g. low data rate, non-real time, delay-tolerant and sporadic traffic). Also, unnecessary handover preparations may be avoided.

Embodiments of the invention may be well-suited for implementation in a 5G network.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A User equipment (UE) comprising:
at least one processor; and
at least one memory including computer program code, the at least one memory and the computer program code configured to, with the at least one processor, control operation of the user equipment including controlling the UE to cooperate with a network element to establish a moving tracking area (MTA) associated with the UE, the MTA including a set of cells including at least three cells, and to transition the UE between operational states including a radio resource control (RRC) Idle state, an RRC connected state associated with an assigned cell radio network temporary identifier (C-RNTI) and an enabled moving tracking area (MTA) state associated with an assigned MTA-RNTI that is at least part of a context that identifies the UE to the cells of the set of cells of the MTA and whereby the UE is able to travel between and communicate through the cells of the set of cells of the MTA with less signaling than required in the RRC connected state.

2. The user equipment of claim 1 wherein the set of cells of the MTA is established based on cell quality measurements reported by the UE to the network element and updated when measurements of a new cell exceed a threshold value that is determined from quality measurements of the cells in the current set.

3. The user equipment of claim 1 wherein the RRC connected state is associated with a determination that a relatively large amount of data is available to be transmitted to or from the UE as compared to the amount of data associated with the enabled moving tracking area state.

4. The user equipment of claim 1 wherein the enabled moving tracking area state is associated with a relatively small amount of data to be transmitted to or from the UE as compared to the amount of data associated with the RRC connected state.

5. The user equipment of claim 1 wherein the MTA includes at least one cell of a radio access network (RAN).

6. The user equipment of claim 5 wherein the at least one memory and the computer program code are configured to, with the at least one processor, control the UE so that the UE informs the RAN if the UE moves to a cell that is not present in the current MTA.

7. The user equipment of claim 5 wherein the at least one memory and the computer program code are configured to, with the at least one processor, control the UE so that the UE accepts an update of the MTA from the RAN if the UE moves from a cell within the MTA to a cell that is not present in the current MTA wherein the update includes at least adding the cell that is not present in the current MTA to the set of cells of the MTA.

8. The user equipment of claim 5 wherein the at least one memory and the computer program code are configured to, with the at least one processor, control the UE so that the UE accepts an identification of cells as the MTA from the RAN.

9. The user equipment of claim 5 wherein the at least one memory and the computer program code are configured to, with the at least one processor, control the UE to, when operating in the MTA enabled state, monitor a downlink channel for RAN paging using the assigned MTA-RNTI.

10. The user equipment of claim 1 wherein the at least one memory and the computer program code are configured to, with the at least one processor, control the UE to, when operating in the MTA enabled state, monitor a downlink channel for downlink data using the assigned MTA-RNTI.

11. The user equipment of claim 1 wherein the C-RNTI and the MTA-RNTI are different radio network temporary identifiers.

12. The user equipment of claim 1 wherein the at least one memory and the computer program code are configured to, with the at least one processor, control the UE to receive a command from a base station of a cell included in the MTA to switch to another operating state.

13. The user equipment of claim 1 wherein the MTA enabled state corresponds to a low overhead connected state.

14. A network element comprising:
   at least one processor;
   at least one memory including computer program code, the at least one memory and the computer program code configured to, with the at least one processor, control operation of the network element including controlling the network element to maintain a UE context for a user equipment (UE) in cooperation with the UE, the maintaining including establishing and storing information defining a moving tracking area (MTA) for the UE, the MTA including a set of cells with at least three cells, the MTA being and area including the set of cells wherein the UE, when in a MTA enabled state, is able to travel between and communicate through the cells of the MTA with less signaling than would be required if the UE were in a radio resource control (RRC) connected state.

15. The network element of claim 14 wherein the set of cells of the MTA is established and updated based on cell quality measurements reported by the UE.

16. The network element of claim 14 wherein the at least one memory and the computer program code are configured to, with the at least one processor, control the network element to update the MTA if the UE moves from a cell within the MTA to a cell that is not present in the current MTA.

17. The network element of claim 14 wherein the at least one memory and the computer program code are configured to, with the at least one processor, control the network element to communicate the UE-context to other base stations within the MTA.

18. The network element of claim 14 wherein the at least one memory and the computer program code are configured to, with the at least one processor, control the network element to, upon receipt of a downlink data unsuccessful message for the UE, send a paging request message to at least one further base station within the MTA, and upon receiving an acknowledgment of one of the at least one further base station indicating that the UE is located in a certain cell within the MTA, transmitting the downlink data to the further base station serving the cell in which the UE is located for enabling the forwarding of such downlink data to the UE by the further base station serving the cell in which the UE is located.

19. The network element of claim 14 wherein the at least one memory and the computer program code are configured to, with the at least one processor, control the network element to direct the UE to switch to the MTA enabled state upon receipt of corresponding UE related information or an event triggered UE measurement report.

20. The network element of claim 19 wherein UE related information is related to one or more UE parameters including one or more of UE category, one or more aspects of a UE-profile, comprising Quality of Service, Traffic, Speed, and an anticipated deployment scenario.

\* \* \* \* \*